United States Patent [19]
Newton

[11] Patent Number: 6,038,918
[45] Date of Patent: Mar. 21, 2000

[54] INSTRUMENT FOR TESTING AUTOMATIC TRANSMISSION FLUID CONTROL DEVICES

[75] Inventor: William T. Newton, 6012 Green Valley Rd., Knoxville, Tenn. 37914

[73] Assignee: William T. Newton, Knoxville, Tenn.

[21] Appl. No.: 08/995,177

[22] Filed: Dec. 22, 1997

[51] Int. Cl.⁷ .................................................. G01M 15/00
[52] U.S. Cl. ........................................ 73/118.1; 73/865.9
[58] Field of Search ............................... 73/865.9, 118.1, 73/115, 116, 117.2, 117.3, 49.7, 47

[56] References Cited

U.S. PATENT DOCUMENTS

| | | | |
|---|---|---|---|
| 4,562,729 | 1/1986 | Maloney | 73/118.1 |
| 4,593,556 | 6/1986 | Wehr | 73/118 |
| 4,732,036 | 3/1988 | Weeder | 73/118.1 |
| 4,951,205 | 8/1990 | Lowe | 364/424.1 |
| 4,998,437 | 3/1991 | Magoolaghan | 73/118.1 |
| 5,060,177 | 10/1991 | Gregory et al. | 73/118.1 |
| 5,129,259 | 7/1992 | View et al. | 73/118.1 |
| 5,460,582 | 10/1995 | Palansky | 477/138 |
| 5,467,644 | 11/1995 | Schaffer | 73/118.1 |
| 5,515,272 | 5/1996 | Sakai | 364/424.1 |
| 5,521,818 | 5/1996 | Palansky | 364/424.1 |
| 5,558,311 | 9/1996 | Connolly | 251/129.15 |
| 5,712,434 | 1/1998 | Sylvis | 73/118.1 |
| 5,746,174 | 5/1998 | Abe et al. | 73/118.1 |

Primary Examiner—George Dombroske

[57] ABSTRACT

A test instrument used by mechanics who trouble-shoot or who rebuild automatic transmissions for automobiles, truck and other conveyances, or who repair automatic transmission solenoids and pressure switches. Simulated operating conditions are provided which allow the testing of solenoids and pressure switches which have been removed from an automatic transmission.

9 Claims, 6 Drawing Sheets

INSTRUMENT FOR TESTING AUTOMATIC TRANSMISSION FLUID CONTROL DEVICES

BACKGROUND

1. Field of the Invention

The invention relates to automatic transmission testers, specifically to such test instruments which test solenoids and pressure switches after they have been removed from an automatic transmission.

2. Description of Prior Art

The shifting and fluid pressure regulation of the modern automatic transmission is controlled by fluid control devices called shift solenoids, pressure regulation solenoids called force motor solenoids, and pressure switches. These devices supply and regulate the flow of fluid to perform various functions of the automatic transmission. Solenoids are devices consisting of an electrical coil which, when a given amount of electrical current flows through it, activates a valve to control the flow of transmission fluid. A pressure switch is a device containing an electrical switch which is activated when fluid pressure is applied. A defective solenoid or pressure switch will cause an automatic transmission to malfunction. When a solenoid becomes defective, the usual cause is an obstruction to fluid flow in the solenoid valve from fluid contamination or to an open or short circuit in the solenoid coil. Usually, a solenoid is identified as being faulty by a commercially available computerized diagnostic device as suggested by U.S. Pat. No. 5,521,818 to Palansky (1995). This diagnostic device is used to identify faults in an automatic transmission while it is still mounted and operating in a vehicle. Thus there is a need for a test instrument which allows a solenoid, suspected of being faulty as indicated by the above diagnostic device, to be removed from the automatic transmission and individually tested. The repaired or replacement solenoid can then be tested by the test instrument before being remounted in the transmission.

OBJECTS AND ADVANTAGES

Accordingly, several objects and advantages of the present invention are:

(a) To provide an instrument for testing automatic transmission shift solenoids, force motor solenoids, pressure switches, solenoid packs, and pressure switch packs, which have been removed from an automatic transmission and testing them under simulated driving conditions.

(b) To provide a test instrument which quickly and accurately determines if a solenoid or a pressure switch is operating properly.

(c) To provide a test instrument which will simultaneously indicate current and voltage at the point at which a solenoid activates and deactivates.

(d) To provide a test instrument in which all pressure gauges, meters, and controls are located on a single control panel and arranged for the most efficient use of the instrument.

(e) To provide a test instrument with a means of protecting the test instrument's meters, circuitry, solenoids, and pressure switches from excessive currents, voltages, and short circuits which could be encountered during the testing operation without the use of fuses or circuit breakers.

(f) To provide a test instrument enclosed in a case with a lockable lid, a carrying handle, and storage space for tools, solenoid adapters, cables, and hoses required for its use.

(g) To provide a test instrument which provides an extension hose for testing solenoid packs and pressure switch packs external of the test instrument, in order for the elements of the packs to be accessible to the operator of the test instrument.

(h) To provide a test instrument containing an ohmmeter designed especially for measuring resistance of a solenoid coil or pressure switch under simulated operating conditions, also allowing discovery of faults occurring under prolonged operation conditions. These operations cannot be performed with the use of the normally available ohmmeter.

(i) To provide a test instrument containing a dual-range ammeter and voltmeter specifically designed to indicate realistic electrical conditions encountered in the process of operating solenoids and pressure switches.

(j) To provide a test instrument which provides a means of eliminating the cause of a malfunction when the malfunction is determined by the test instrument to be foreign matter lodged within the fluid piping of the solenoid.

DRAWING FIGURES

REFERENCE NUMBERS IN DRAWINGS

| | |
|---|---|
| 10 Case | 11 Chassis |
| 12 Control Panel | 13 Vertical Side of Chassis |
| 14 Latch | 15 Hasp |
| 16 Storage Bracket | 17 Air Filter |
| 18 Lid | 19 Handle |
| 20 Jumper Cable | 21 Air Circuit |
| 22 Air Supply Compressor | 23 Pressure Regulator |
| 24 Air Supply Pressure Gauge | 25 Air Out Valve |
| 26 Output Pressure Gauge | 27 Compressor Hose |
| 28 Output Shut-Off Coupler | 29 Exhaust Pressure Gauge |
| 30 Exhaust Valve | 31 Pack Adapter |
| 32 Exhaust Hose | 33 Power Cord |
| 34 Fuse | 35 Pilot Light |
| 36 Variable Transformer | 37 Transformer |
| 38 Bridge Rectifier | 39 Capacitor |
| 40 Ammeter | 41 Volt-Ohmmeter |
| 42 Current Range Switch | 43 Potentiometer |
| 44 Diode | 45 Red Jumper Terminal |
| 46 Black Jumper Terminal | 47 Push Button Switch |
| 48 .9 Ohm Resistor | 49 3.68 Ohm Resistor |
| 50 1000 Ohm Resistor | 51 20 Ohm Resistor |
| 52 82 Ohm Resistor | 53 9300 Ohm Resistor |
| 54 Pressure Switch | 55 Test Leads |
| 56 5000 Ohm Resistor | 57 Force Motor Solenoid |
| 58 Pressure Switch Adapter | 59 Power Switch |

-continued

| | |
|---|---|
| 60 Current Control Knob | 61 Power Cord Grommet |
| 62 Back Exhaust Grommet | 63 Power Plug |
| 64 Positive Current Output Terminal | 65 Negative Current Output Terminal |
| 66 Exhaust Hose Grommet | 67 Extension Hose |
| 68 Compressor Hose Coupler | 69 Variable Voltage Supply |
| 70 Current Measuring Circuit | 71 Current Limiter |
| 72 Voltage Limiter | 73 Volt-Ohmmeter Circuit |
| 74 Red Voltmeter Terminal | 75 Black Voltmeter Terminal |
| 76 Shift Solenoid Adapter | 77 Exhaust Tubing |
| 78 Exhaust Shut-Off Coupler | 79 Solenoid Pack |
| 80 Test Instrument | 81 Shift Solenoid |
| 82 Force Motor Adapter | 83 Electrical Circuit |
| 84 Pipe to Pressure Regulator | 85 Pipe to 160 PSI Gauge |
| 86 Tubing to Air Out Valve | 87 Tubing to Gauge Tee |
| 88 Tee Fitting | 89 Tubing to Gauge |
| 90 Tubing to Tester Output | 91 Tee Fitting |
| 92 Tubing to Exhaust Gauge | 93 Tubing to Exhaust Valve |

SUMMARY

In accordance with the present invention a test instrument which test automatic transmission solenoids and pressure switches not installed in a automatic transmission.

DESCRIPTION

Figure 1:
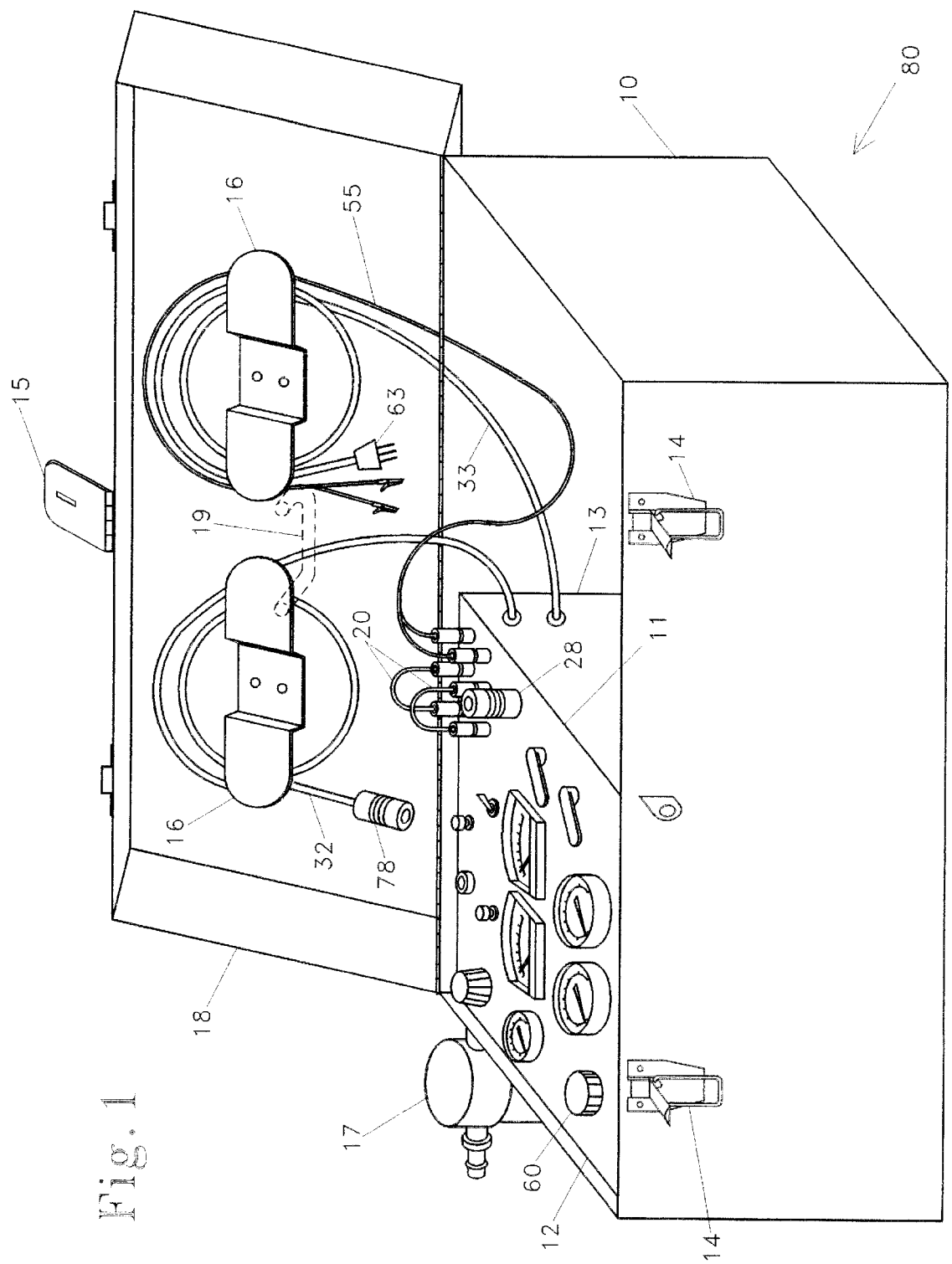
FIG. 1 shows the basic embodiment of the present invention.

FIG. 1 shows construction of a test instrument 80 enclosed in a case 10 containing a chassis 11 bent into an "L" shape with edges bend at 90° to form mounting flanges. The horizontal face of the chassis is used as a control panel 12 while a vertical side 13 is used for mounting components of the electrical circuit. The chassis occupies approximately one half of the space within the case. Two hose and cable storage brackets 16 are fastened to the underside of a hinged lid 18. The lid has two latches 14, a hasp 15, and a carrying handle 19 on the upper side of the lid.

Figure 2:
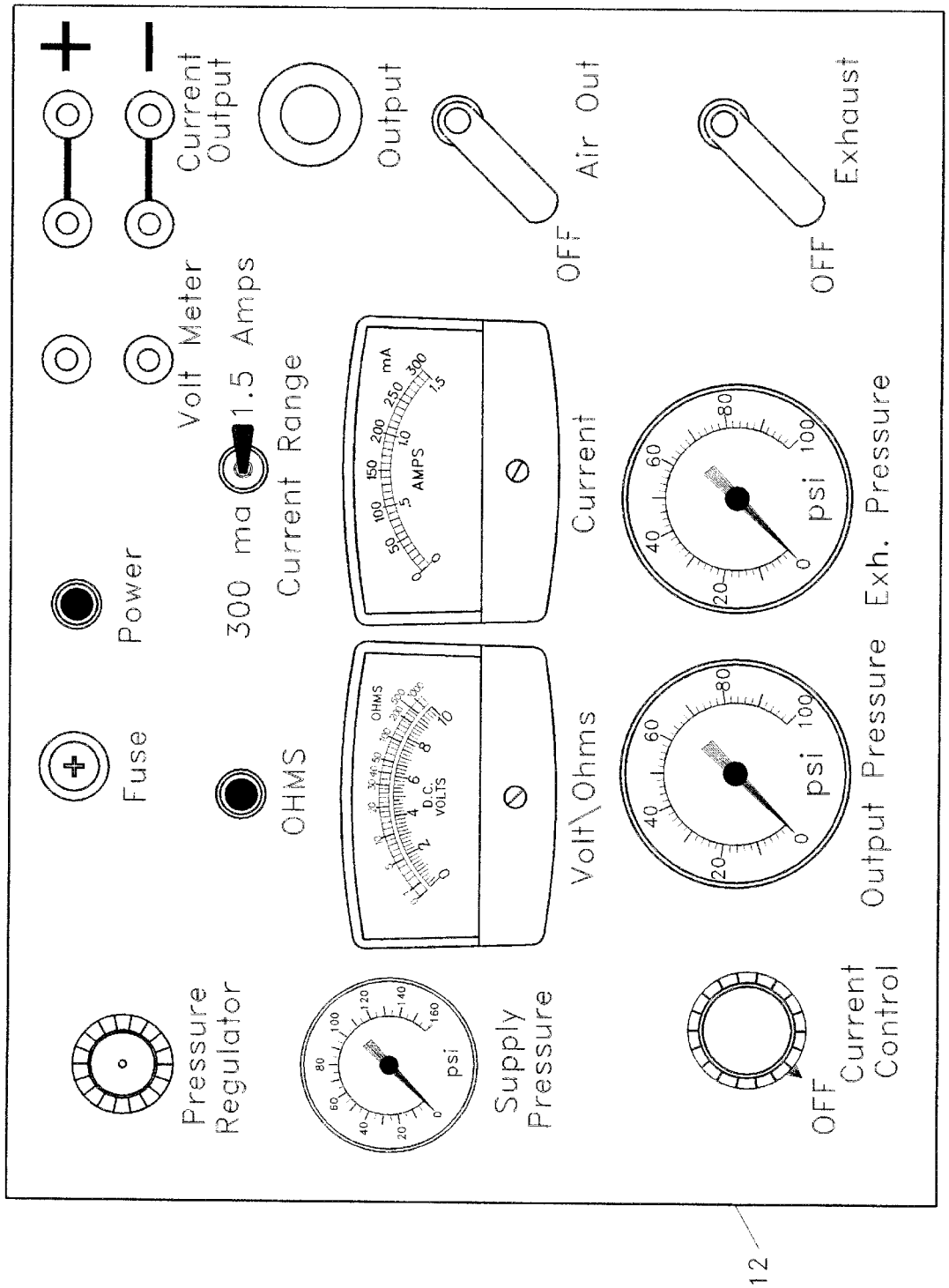
FIG. 2 shows the control panel of the present invention.

FIG. 2 shows placement of components which are mounted on control panel 12. Components are identified by labels printed beneath the components.

Figure 3:
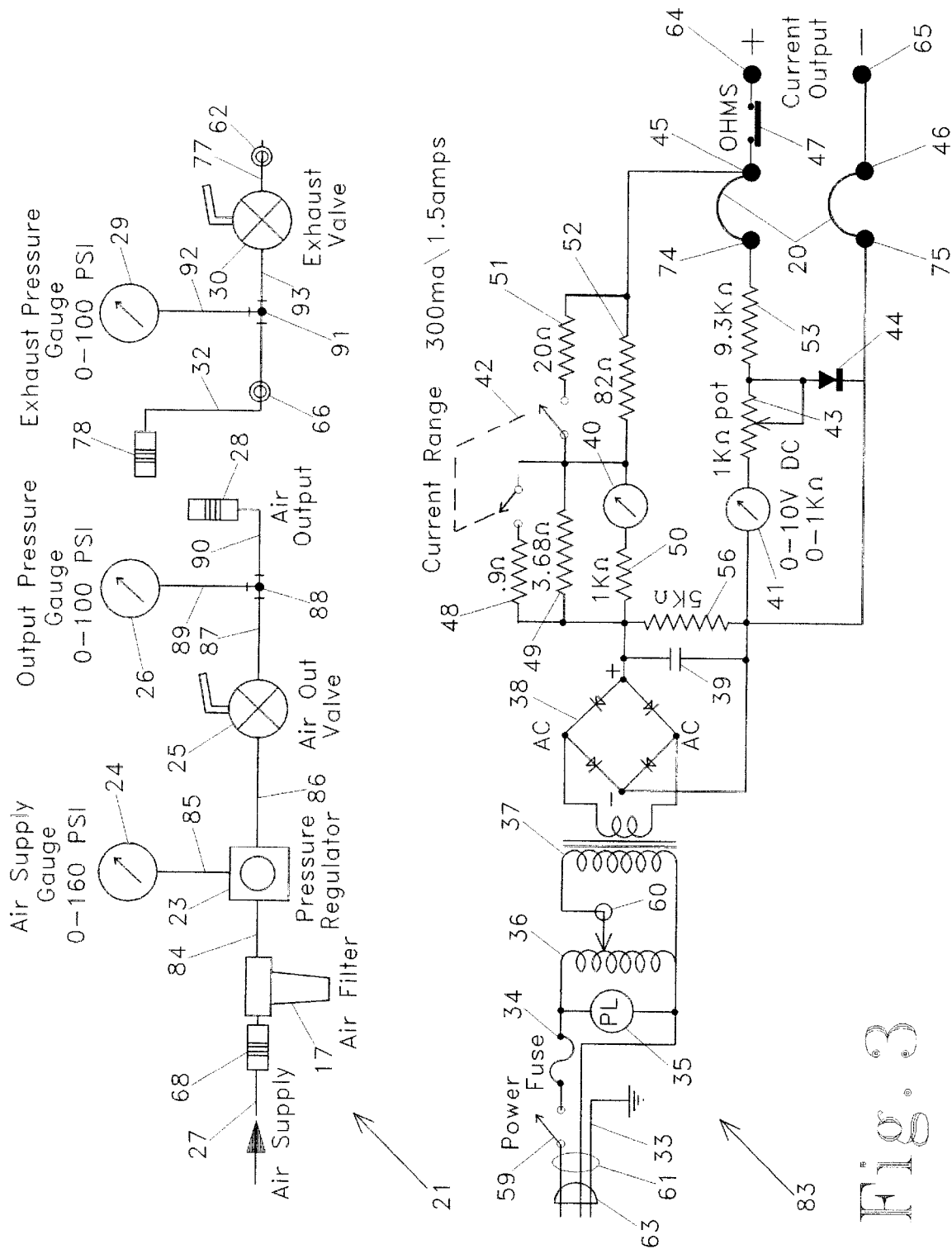
FIG. 3 shows a circuit diagram of the present invention.

FIG. 3 shows a circuit diagram of an electrical circuit 83 and an air circuit 21. The components of the electrical circuit which are not shown on the control panel (FIG. 2) are mounted on inner vertical side 13 of chassis 11 (FIG. 1).

Power connection to the rectifying and filter circuit consisting of the bridge rectifier 38, filter capacitor 39, and bleeder resister 56 is by means of plug 63 and power cord 33 which passes through grommet 61 to switch 59 which has a built in pilot light 35, fuse 34, and variable voltage transformer 36. The control shaft of the variable voltage transformer passes through the panel to a current control knob 60. The variable voltage transformer output connects to a transformer 37. The bridge rectifier and transformer are bolted to inner vertical side 13 of chassis 11 (FIG. 1). Resistors 48, 49, 50, 51, 52, 53, 56, potentiometer 43, capacitor 39, and diode 44 are mounted on a terminal board on the inside surface of the vertical side of chassis. Current output terminals 64 and 65, jumper terminals 45 and 46, and voltmeter terminals 74 and 75 are mounted on control panel 12 (FIG. 2). A push button switch 47 is connected between terminals 45 and 64. A dual-range ammeter 40, and current range switch 42, and a ohm-voltmeter 41 are mounted on the control panel.

Piping between the components of the test instrument, as shown by an air circuit 21 (FIG. 3), is by means of brass pipe, plastic tubing, and appropriate brass fittings as follows:

An air filter 17 mounted on the outside of case 10 (FIG. 1) is connected by a pipe 84 to an air pressure regulator 23. The gauge outlet of the pressure regulator is connected by a pipe 85 to an air supply pressure gauge 24. The air outlet of the pressure regulator is connected by a tubing 86 to the inlet of an air out valve 25. The outlet of valve 25 is connected by a tubing 87 to a tee fitting 88. The tee fitting is connected by a tubing 89 to an output pressure gauge 26. The tee fitting also is connected by a tubing 90 to an output shut-off coupler 28. An exhaust shut-off coupler 78 is connected to a tee fitting 91 by an exhaust hose 32 which passes through a grommet 66. The tee fitting is connected to an exhaust pressure gauge 29 by a tubing 92. The tee fitting is also connected to an exhaust valve 30 by a tubing 93. The output of the exhaust valve is connected to a tubing 77 which passes through a grommet 62 to a short distance outside the tester case.

OPERATION

Figures 4A, 4B:
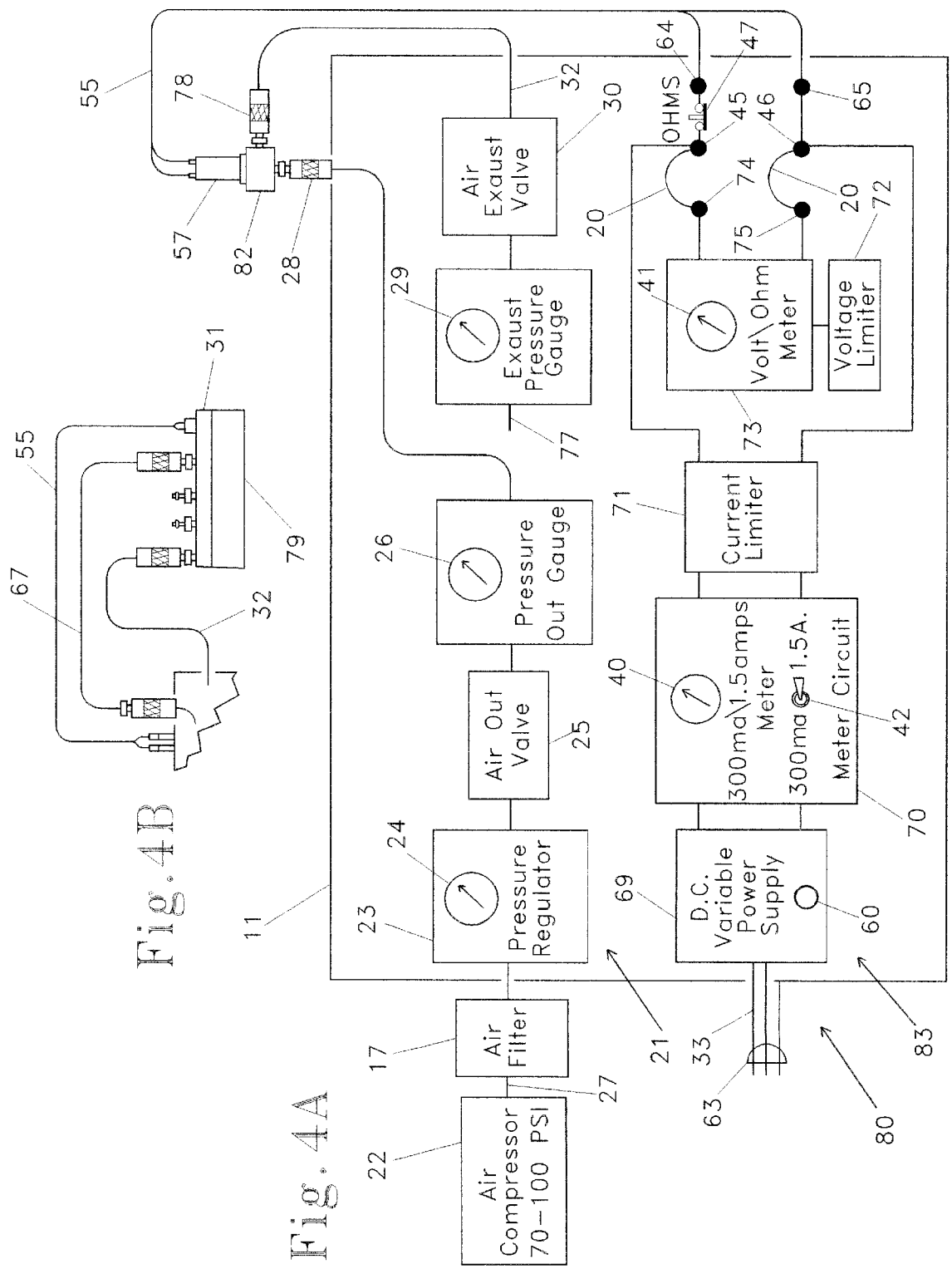
FIG. 4A is a block diagram showing elements of the present invention.
FIG. 4B shows the attachment of a solenoid pack to the present invention.

FIG. 3 is a circuit diagram of test instrument 80. FIG. 4A represents the various elements of the test instrument by a block diagram which is included as an aid to understanding the circuitry and test process.

Air for the testing process is furnished by a standard air compressor 22 with a hose 27 supplied by the user. Air pressure of approximately 100 PSI is required. Air enters the test instrument through a compressor hose coupler 68 (FIG. 3) to air filter 17 which removes water, oil, and foreign material from the air. The air filter output is piped directly into air pressure regulator 23. The air regulator is set to 70 PSI, which is required for the testing process and is indicated by gauge 24. Air circuit 21 assists in determining the operating parameters of the solenoid being tested as follows:

Valve 25 acts as a variable orifice causing a pressure drop of the air entering a solenoid 57 and is indicated by gauge 26. Air flow from the exhaust outlet of solenoid 57 flows through valve 30 which acts as a variable orifice causing a pressure drop which is indicated by gauge 29. Exhaust valve 30 and exhaust pressure gauge 29 are used only when testing force motor solenoids.

A variable voltage power supply 69 (FIG. 4A) composed of variable voltage transformer 36, power transformer 37, bridge rectifier 38, filter capacitor 39, and bleeder resistor 56 (FIG. 3) supplies 0–35 volts direct current for the testing process. Current output is through terminals 64 and 65.

An electrical current measuring circuit 70 (FIG. 4A) and, referring to FIG. 3, composed of meter 40, resistors 48, 49 and 50, and current range switch 42 provides a dual range ammeter having a low range of 0–300 milliamps for testing shift solenoids and a high range of 0–1.5 amps for testing force motor solenoids.

When current range switch 42 is open and in the 300 milliamp position, resistor 49 acts as a meter shunt and causes the full range reading of the meter to be 300 milliamps. When the current range switch is closed and in the 1.5 amp position, the parallel combination of resistor 48 and resistor 49 act as a shunt for the meter causing a full scale reading of 1.5 amps.

FIG. 4A shows a current limiter 71 composed of resistor 51, resistor 52, and current range switch 42 (FIG. 3). Resistor 52 limits the maximum current flowing through meter 40 to a value slightly higher than full scale but not sufficient to cause damage to the meter when the current range switch is open and in the 300 milliamp position. When current range switch 42 is closed and in the 1.5 amp position, the parallel combination of resistor 51 and resistor 52 limits the maximum current through meter 40 to a value slightly higher than full scale but not sufficient to damage the meter or power supply.

FIG. 4A shows a volt-ohmmeter circuit 73 and a voltage limiter 72. The voltmeter circuit consists of meter 41 and series resistor 53 (FIG. 3). Resistor 53 causes full scale value of the voltmeter to be 10 volts. The combination of potentiometer 43 and diode 44 limits the maximum voltage across the meter 41 to a value slightly greater than full scale but not sufficient to cause damage to the meter. Input to the voltmeter is from jumper terminals 45 and 46, through jumpers 20, to voltmeter terminals 74 and 75. Operation of the ohmmeter is as follows:

The device (who's resistance is to be measured) is connected to the tester (FIG. 4A) using test leads 55. Current range switch 42 (FIG. 3) is set to 1.5 amps. The ohms button 47 is first held down. This disconnects the device (who's resistance is to be measured) from the current circuit. Voltmeter 41 is then set to 10 volts using current control knob 60. The ohms button is now released thus reconnecting the device (who's resistance is to be measured) to the current circuit. It's resistance is shown on the ohms scale of meter 41. During the time resistance is indicated, ammeter 40 indicates current through the device (who's resistance is to be measured). The current drawn is similar to that encountered under typical operating conditions of a transmission.

Figure 5:
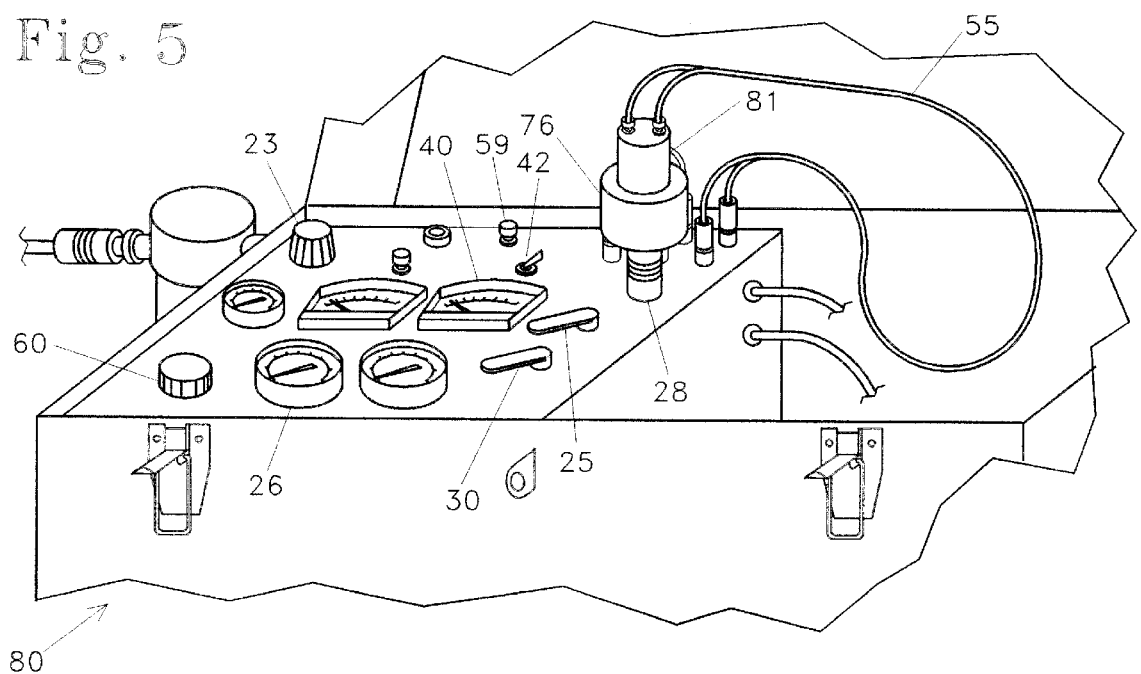
FIG. 5 shows the present invention while it is testing a shift solenoid.

FIG. 5 shows test instrument 80 testing a shift solenoid 81. The solenoid is mounted on an adapter 76. Each solenoid or pressure switch to be tested must have an adapter conforming to its particular size and shape to match it to output shut-off coupler of the test instrument. The adapter is an obvious necessity and is therefore not included in the claims of this invention. The adapter containing solenoid 81 is plugged into output shut-off coupler 28. Test leads 55 are connected to the solenoid coil terminals. At the start of all testing procedures power switch 59 is on, air pressure regulator 23 is set to 70 PSI, current control knob 60 is set to 0, and valves 25 and 30 are in the closed position. A data book is supplied with the tester consisting of a listing of commonly used solenoids and pressure switches with resistance and operating parameters of each. The testing procedure is as follows:

Coil resistance is measured as describe above. A ground fault test may be performed by measuring resistance from one of the coil terminals to the metal housing of the solenoid. Current range switch 42 is set to 300 milliamps. Using valve 25, gauge 26 is set to the valve give in the data book for the solenoid. Using current control knob 60, current indicated by meter 40 is slowly increased until the solenoid is activated. This is recognized by an abrupt change in pressure indicated by gauge 26. Current, voltage, and pressure are recorded at this activation point. Current, voltage, and pressure are again recorded at the point where there is no further change in pressure as the current is further increased and these are also recorded at the deactivation point which occurs as current is slowly reduced back to 0. The data thus recorded is compared to values given in the data book and interpreted to determine the condition of the solenoid.

Figure 6:
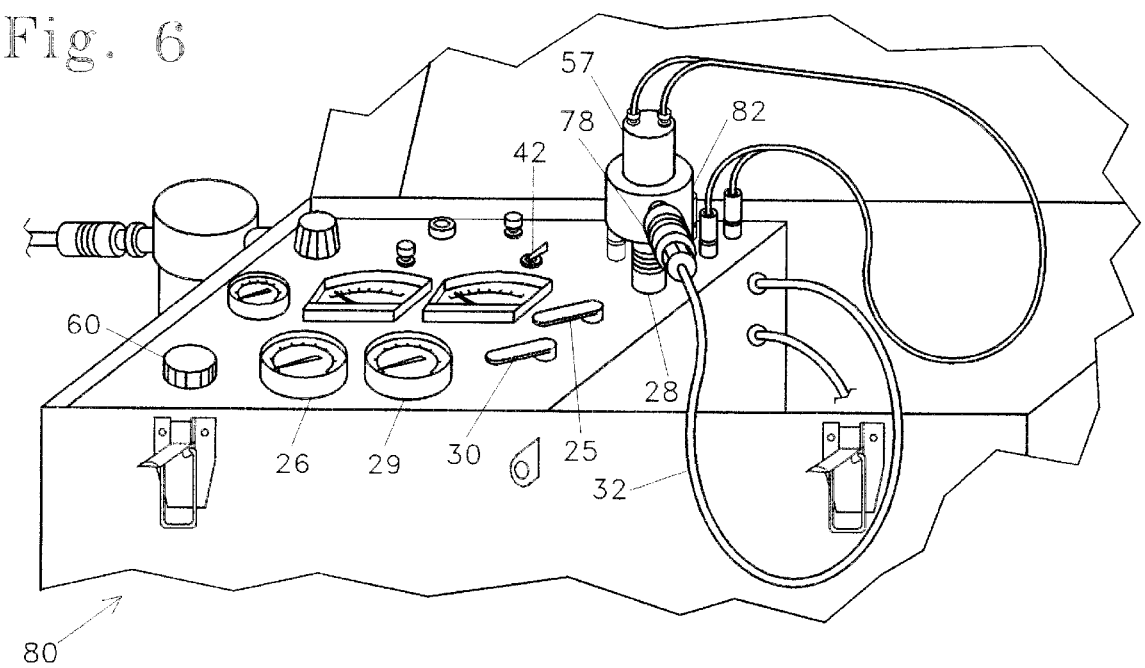
FIG. 6 shows the present invention while it is testing a force motor solenoid.

FIG. 6 shows the test instrument 80 while it is testing a force motor solenoid 57. The solenoid is mounted on an adapter 82 and plugged into output shut-off coupler 28. Exhaust hose 32 is connected by exhaust coupler 78 to a plug on the side of the adapter. Current range switch 42 is set to 1.5 amps.

A coil resistance and ground fault test is performed and results recorded. The current range switch remains at 1.5 amps. Using valve 25, gauge 26 is set to the valve given in the data book. Using valve 30, exhaust pressure gauge 29 is set to the valve given in the data book.

As current control knob 60 is slowly increased, current, voltage, and pressure as indicated by exhaust pressure gauge 29 are recorded at the point where the exhaust pressure begins to change. As current is increased further, exhaust pressure changes in proportion to change in current. Current, voltage, and pressure are recorded at the point where further increase in coil current no longer causes a change in pressure. This data is recorded and compared to values given in the data book to determine the condition of the force motor solenoid.

Figure 7:
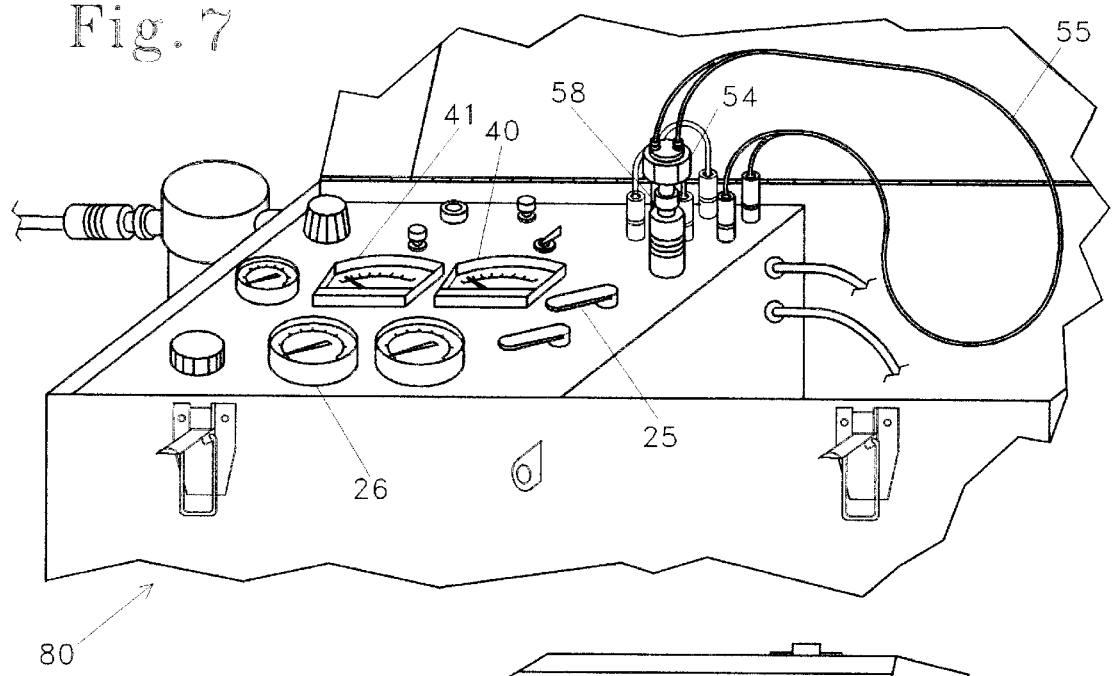
FIG. 7 shows the present invention while it is testing a pressure switch.

FIG. 7 shows test instrument 80 testing a pressure switch 54. The pressure switch terminals are connected to the test instrument by leads 55 and the pressure switch is mounted on the test instrument using an adapter 58. The test instrument is set to the resistance measuring mode as described above. If the pressure switch contacts are normally open, ohmmeter 41 will read full scale, indicating that the contacts are open. When valve 25 is slowly opened the pressure as indicated by gauge 26 will increase. Pressure is recorded at the point where the pressure switch contacts close. This is indicated by the ohmmeter abruptly reading 0 ohms.

If the pressure switch to be tested has contacts that are normally closed, initial resistance reading is 0 indicating that the contacts are closed. As the pressure is slowly increased, pressure reading of gauge 26 is recorded at the point that the ohmmeter abruptly reads full scale. This indicates that the pressure switch contacts are open. Data recorded at this time is compared to values given in the data book to determine the condition of the pressure switch.

The testing procedure presented above allows the pressure switch to be tested under current, voltage, and pressure values similar to actual operating conditions.

Figure 8:
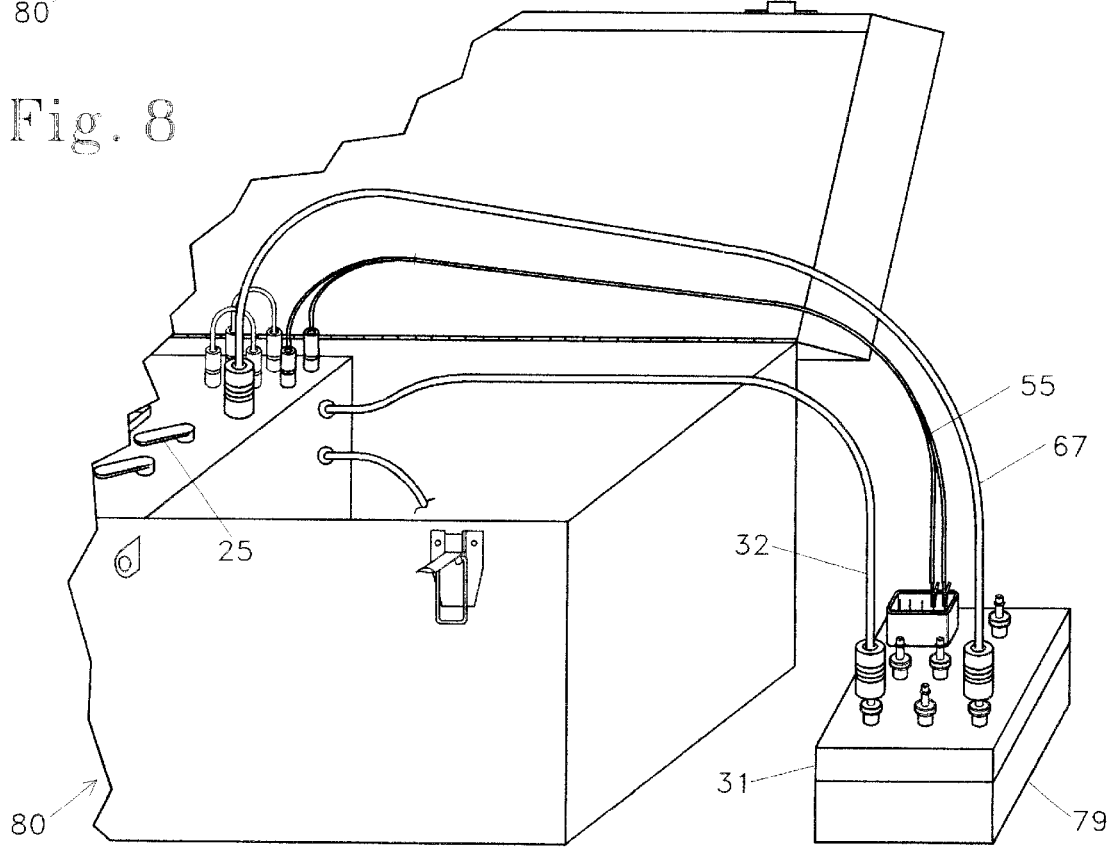
FIG. 8 shows the present invention while it is testing a solenoid pack.

FIGS. 8 and 4B shows test instrument 80 testing a pack 79 which contains solenoids, pressure switches, or a combination of both. The pack is mounted on an adapter 31 and attached to the test instrument by test leads 55, an air extension hose 67, and also by exhaust hose 32 if a force motor is in the pack. Such packs are tested external to the test instrument as a means of conveniently testing each element of the pack individually as described above.

When the test instrument indicates a solenoid under test has a malfunction because of foreign matter lodged in the fluid piping within the solenoid, the foreign matter can be expelled from the solenoid by setting air pressure regulator 23 to maximum pressure and quickly opening valve 25, causing a pulse of high pressure air to pass through the solenoid piping thus eliminating the malfunction.

I claim:

1. A test instrument for quickly detecting defects in the fluid control devices associated with a vehicle automatic transmission, said fluid control devices having been removed from said automatic transmission, and said instrument comprising of:

a. a 0–35 volt variable voltage power supply operatively associated with a current limiting circuit, as means of supplying a controllably variable electric current to said fluid control device known as a solenoid, and b. a dual range ammeter, operatively associated with said power supply and the current limiter, as monitoring means of determining value of current flow to the coil of said solenoid, and c. a volt ohmmeter as monitoring means of determining resistance and voltage simultaneously when testing a solenoid coil or when testing contact resistance of a fluid control device known as a pressure switch, and d. an air circuit operatively associated with a supply of pressure regulated compressed air as means of supplying air flow to fluid passages of said solenoid, and e. an air output ball valve as control means of quickly varying said air flow into said fluid passages of said solenoid, and f. an air out pressure gauge located at output of said air out ball valve, as monitoring means of determining air pressure at input of said solenoid, and g. an exhaust ball valve as control means of quickly varying said air flow exiting from said fluid passages of said solenoid, and h. an exhaust pressure gauge located at input of said exhaust ball valve as monitoring means of determining air pressure at output of said solenoid.

2. The test instrument of claim 1 wherein a horizontal surface which forms the top surface of chassis of said test instrument is mounting means for arranging said air out ball valve, said exhaust ball valve, said dual range ammeter, said volt ohmmeter, and current control of said power supply as appropriate means of performing the testing operation in the most accurate and shortest possible period of time.

3. The test instrument of claim 2 wherein said test instrument provides an enclosure having a lid as means of providing protection to the electrical meters mounted on said horizontal surface of said chassis; said enclosure also providing closure for open sides of said chassis, as means of protecting the electrical and air circuitry located on inside surfaces of said chassis.

4. The test instrument of claim 3 wherein said dual range ammeter is provided having a range of 0–300 milliamps as means of testing shift solenoids and a range of 0–1½ amps as means of testing force motor solenoids; said dual range ammeter interconnected with said current limiting circuit as means of limiting current output of said power supply to a value slightly over 300 milliamps when current range switch is set to 300 milliamps and as means of limiting said current output to a value slightly over 1.5 amps when said range switch is set to 1½ amps; thus providing over current protection for said dual range ammeter in each current range.

5. The current limiter of claim 4 wherein said current limiting circuit providing means of eliminating the need to provide fuses and circuit breakers which can cause disruption of the testing process and time loss in the advent of excessive current flow.

6. The test instrument of claim 5 wherein said volt ohmmeter is supplied as means of monitoring voltage applied to said solenoid coil and monitoring resistance of said solenoid coil simultaneously when said solenoid coil is being tested for change in said resistance caused by heat rise over an extended period of time.

7. The test instrument of claim 6 wherein said volt ohmmeter is supplied as means of testing said pressure switch under simulated operating conditions; said volt ohmmeter also providing means of determining faults of said pressure switch occurring due to heat rise over a period of time, said air out ball valve providing means of controlling pressure applied to said pressure switch as means of activating said pressure switch.

8. The test instrument of claim 6 wherein extension hoses are required due to physical design of said test instrument as means of connecting solenoid packs containing a plurality of said shift solenoids, said force motor solenoids, and said pressure switches to said test instrument and provide access to the electrical cable connectors of said solenoid packs; furthermore providing means of quickly and accurately testing components of said solenoid packs.

9. The test instrument of claim 3 wherein said test instrument provides said air out ball valve as means of applying a pulse of high velocity air, pressure regulator having been adjusted to maximum pressure, to the piping of said solenoid when said solenoid malfunction is due to foreign matter, resulting in expulsion of said foreign matter.

* * * * *